US008015204B2

(12) United States Patent
Kaler et al.

(10) Patent No.: US 8,015,204 B2
(45) Date of Patent: Sep. 6, 2011

(54) SCOPED ACCESS CONTROL METADATA ELEMENT

(75) Inventors: Christopher G. Kaler, Sammamish, WA (US); Giovanni M. Della-Libera, Seattle, WA (US); Elliot Waingold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 10/270,441

(22) Filed: Oct. 15, 2002

(65) Prior Publication Data

US 2003/0074356 A1 Apr. 17, 2003

Related U.S. Application Data

(60) Provisional application No. 60/371,155, filed on Apr. 10, 2002, provisional application No. 60/346,370, filed on Oct. 19, 2001, provisional application No. 60/329,796, filed on Oct. 16, 2001.

(51) Int. Cl.
*G06F 17/30* (2006.01)

(52) U.S. Cl. ................................ 707/783; 707/999.009

(58) Field of Classification Search ................ 707/1-10, 707/100, 783, 802, 999.001, 999.003, 999.006, 707/999.009, 999.101, 786, 791; 711/163
See application file for complete search history.

(56) References Cited

U.S. PATENT DOCUMENTS

| | | | |
|---|---|---|---|
| 4,953,210 | A | 8/1990 | McGlynn |
| 5,067,104 | A | 11/1991 | Krishnakumar |
| 5,224,098 | A | 6/1993 | Bird |
| 5,438,508 | A | 8/1995 | Wyman |
| 5,499,343 | A | 3/1996 | Pettus |
| 5,509,000 | A | 4/1996 | Oberlander |
| 5,608,551 | A | 3/1997 | Biles |
| 5,680,551 | A | 10/1997 | Martino |
| 5,761,477 | A | 6/1998 | Wahbe |
| 5,862,411 | A | 1/1999 | Kay |
| 5,903,882 | A | 5/1999 | Asay |
| 5,917,912 | A | 6/1999 | Ginter |
| 5,935,219 | A | 8/1999 | Holmes |
| 5,968,176 | A | 10/1999 | Nessett |
| 5,974,416 | A | 10/1999 | Anand |
| 5,978,836 | A | 11/1999 | Ouchi |

(Continued)

FOREIGN PATENT DOCUMENTS

EP 0715246 6/1996

(Continued)

OTHER PUBLICATIONS

Samjani, "Mobile Internet Protocol", IEEE Potentials, vol. 20, No. 1, Feb.-Mar. 2001, pp. 16-18.

(Continued)

*Primary Examiner* — Marc R Filipczyk
(74) *Attorney, Agent, or Firm* — Workman Nydegger

(57) ABSTRACT

Methods, systems, and data structures for communicating object metadata are provided. A generic metadata container is presented that allows object metadata to be described in an extensible manner using protocol-neutral and platform-independent methodologies. A metadata scope refers to a dynamic universe of targets to which the included metadata statements correspond. Metadata properties provide a mechanism to describe the metadata itself, and metadata security can be used to ensure authentic metadata is sent and received. Mechanisms are also provided to allow refinement and replacement of metadata statements. The generic metadata container can be adapted to dynamically define access control rights to a range of objects by a range of users, including granted and denied access rights.

22 Claims, 6 Drawing Sheets

U.S. PATENT DOCUMENTS

| | | | |
|---|---|---|---|
| 6,006,259 A | 12/1999 | Adelman | |
| 6,026,441 A | 2/2000 | Ronen | |
| 6,047,324 A | 4/2000 | Ford | |
| 6,119,171 A | 9/2000 | Alkhatib | |
| 6,122,363 A | 9/2000 | Friedlander | |
| 6,144,961 A | 11/2000 | De La Salle | |
| 6,151,618 A | 11/2000 | Wahbe | |
| 6,158,010 A | 12/2000 | Moriconi | |
| 6,167,513 A | 12/2000 | Inoue | |
| 6,199,112 B1 | 3/2001 | Wilson | |
| 6,209,124 B1 | 3/2001 | Vermeire | |
| 6,216,231 B1 | 4/2001 | Stubblebine | |
| 6,219,790 B1 | 4/2001 | Lloyd | |
| 6,223,619 B1 | 5/2001 | Narisi | |
| 6,233,619 B1 | 5/2001 | Marisi | |
| 6,243,749 B1 | 6/2001 | Sitaraman | |
| 6,304,913 B1 | 10/2001 | Rune | |
| 6,351,748 B1 | 2/2002 | Deen | |
| 6,356,920 B1 | 3/2002 | Vandersluis | |
| 6,392,997 B1 | 5/2002 | Chen | |
| 6,393,456 B1 | 5/2002 | Ambler | |
| 6,405,212 B1 * | 6/2002 | Samu et al. | 1/1 |
| 6,405,337 B1 | 6/2002 | Grohn | |
| 6,408,342 B1 | 6/2002 | Moore | |
| 6,446,113 B1 | 9/2002 | Ozzie | |
| 6,449,638 B1 | 9/2002 | Wecker | |
| 6,453,356 B1 | 9/2002 | Sheard | |
| 6,466,971 B1 | 10/2002 | Humpleman | |
| 6,477,580 B1 | 11/2002 | Bowman-Amuah | |
| 6,487,552 B1 | 11/2002 | Lei et al. | |
| 6,496,849 B1 | 12/2002 | Hanson | |
| 6,505,233 B1 | 1/2003 | Hanson | |
| 6,505,254 B1 | 1/2003 | Johnson | |
| 6,507,823 B1 | 1/2003 | Nel | |
| 6,507,865 B1 | 1/2003 | Hanson | |
| 6,522,631 B2 | 2/2003 | Rosborough | |
| 6,523,063 B1 | 2/2003 | Miller | |
| 6,532,213 B1 | 3/2003 | Chiussi | |
| 6,546,419 B1 | 4/2003 | Humpleman | |
| 6,571,236 B1 | 5/2003 | Ruppelt | |
| 6,578,066 B1 | 6/2003 | Logan | |
| 6,581,060 B1 * | 6/2003 | Choy | 707/694 |
| 6,601,171 B1 | 7/2003 | Carter | |
| 6,601,189 B1 | 7/2003 | Edwards | |
| 6,615,258 B1 | 9/2003 | Barry | |
| 6,618,825 B1 | 9/2003 | Shaw | |
| 6,654,344 B1 | 11/2003 | Toporek | |
| 6,665,657 B1 | 12/2003 | Dibachi | |
| 6,667,974 B1 | 12/2003 | Shigeta | |
| 6,675,261 B2 | 1/2004 | Shandony | |
| 6,678,827 B1 | 1/2004 | Rothermel | |
| 6,724,726 B1 | 4/2004 | Coudreuse | |
| 6,728,767 B1 | 4/2004 | Day | |
| 6,742,114 B1 | 5/2004 | Carter | |
| 6,745,197 B2 | 6/2004 | McDonald | |
| 6,748,380 B2 * | 6/2004 | Poole et al. | 707/999.009 |
| 6,748,453 B2 | 6/2004 | Law | |
| 6,751,562 B1 | 6/2004 | Blackett | |
| 6,763,040 B1 | 7/2004 | Hite | |
| 6,779,004 B1 | 8/2004 | Zintel | |
| 6,782,414 B1 | 8/2004 | Xue | |
| 6,782,542 B1 | 8/2004 | Mein | |
| 6,789,118 B1 | 9/2004 | Rao | |
| 6,801,528 B2 | 10/2004 | Nassar | |
| 6,850,893 B2 | 2/2005 | Lipkin | |
| 6,850,979 B1 | 2/2005 | Saulpaugh | |
| 6,851,054 B2 | 2/2005 | Wheeler | |
| 6,873,975 B1 | 3/2005 | Hatakeyama | |
| 6,891,953 B1 | 5/2005 | DeMello | |
| 6,920,558 B2 | 7/2005 | Sames | |
| 6,928,442 B2 | 8/2005 | Farber | |
| 6,970,935 B1 | 11/2005 | Maes | |
| 6,976,074 B2 | 12/2005 | Cabrera | |
| 6,990,585 B2 | 1/2006 | Maruyama | |
| 7,035,854 B2 | 4/2006 | Hsaio | |
| 7,051,339 B2 | 5/2006 | Deverill | |
| 7,055,143 B2 | 5/2006 | Ringseth | |
| 7,065,706 B1 | 6/2006 | Sankar | |
| 7,127,511 B2 | 10/2006 | Tonouchi | |
| 7,149,802 B2 | 12/2006 | Cabrera | |
| 7,181,731 B2 * | 2/2007 | Pace et al. | 707/999.01 |
| 7,194,553 B2 | 3/2007 | Lucco | |
| 7,257,817 B2 | 8/2007 | Cabrera | |
| 7,293,283 B2 | 11/2007 | Kaler | |
| 7,409,367 B2 | 8/2008 | McGill | |
| 7,418,457 B2 | 8/2008 | Kaler | |
| 7,451,157 B2 | 11/2008 | Kaler | |
| 7,536,712 B2 | 5/2009 | Kaler | |
| 7,574,575 B2 * | 8/2009 | Ogasawara et al. | 711/162 |
| 2001/0009018 A1 | 7/2001 | Iizuka | |
| 2002/0002581 A1 | 1/2002 | Siddiqui | |
| 2002/0078233 A1 | 6/2002 | Brilils | |
| 2002/0126701 A1 | 9/2002 | Requena | |
| 2002/0138582 A1 | 9/2002 | Chandra | |
| 2002/0143984 A1 | 10/2002 | Hudson | |
| 2002/0152214 A1 | 10/2002 | Muntz | |
| 2002/0157004 A1 | 10/2002 | Smith | |
| 2002/0169781 A1 | 11/2002 | Poole | |
| 2002/0174178 A1 | 11/2002 | Stawikowski | |
| 2002/0178103 A1 | 11/2002 | Dan | |
| 2002/0184319 A1 | 12/2002 | Willner | |
| 2002/0188638 A1 | 12/2002 | Hamscher | |
| 2003/0041178 A1 | 2/2003 | Brouk | |
| 2003/0050966 A1 | 3/2003 | Dutta | |
| 2003/0065942 A1 | 4/2003 | Lineman | |
| 2003/0074357 A1 | 4/2003 | Nielson | |
| 2003/0074367 A1 | 4/2003 | Kaler | |
| 2003/0074482 A1 | 4/2003 | Christensen | |
| 2003/0074579 A1 | 4/2003 | Della-Libera | |
| 2003/0093678 A1 | 5/2003 | Bowe | |
| 2003/0120593 A1 | 6/2003 | Bansal | |
| 2003/0159059 A1 | 8/2003 | Rodriquez | |
| 2004/0034715 A1 | 2/2004 | Dawson et al. | |
| 2005/0138353 A1 | 6/2005 | Spies | |
| 2005/0278390 A1 | 12/2005 | Kaler | |
| 2006/0041743 A1 | 2/2006 | Della-Libera | |
| 2006/0041929 A1 | 2/2006 | Della-Libera | |
| 2006/0212599 A1 | 9/2006 | Lucco | |
| 2006/0253699 A1 | 11/2006 | Della-Libera | |
| 2006/0253700 A1 | 11/2006 | Della-Libera | |
| 2008/0141028 A1 | 6/2008 | Wei | |
| 2008/0263166 A1 | 10/2008 | Beigi | |
| 2009/0046726 A1 | 2/2009 | Cabrera | |
| 2009/0282457 A1 * | 11/2009 | Govindavajhala | 726/1 |

FOREIGN PATENT DOCUMENTS

| | | |
|---|---|---|
| EP | 1003308 | 5/2000 |
| EP | 1024627 | 8/2000 |
| EP | 1118925 | 7/2001 |
| JP | 7141296 | 6/1995 |
| JP | 11204471 | 7/1999 |
| JP | 11328033 | 11/1999 |
| JP | 2000083049 | 3/2000 |
| JP | 2000253066 | 9/2000 |
| JP | 2000516406 | 12/2000 |
| JP | 2000516407 | 12/2000 |
| JP | 2002507295 | 3/2002 |
| WO | 95-34972 | 12/1995 |
| WO | 98-54644 | 12/1998 |
| WO | 99-37066 | 7/1999 |
| WO | 00-04458 | 1/2000 |
| WO | 00-08909 | 2/2000 |
| WO | 00-42748 | 7/2000 |
| WO | 01-46783 | 6/2001 |
| WO | 01-52496 | 7/2001 |
| WO | 01/58108 | 8/2001 |
| WO | 2007-073609 | 7/2007 |

OTHER PUBLICATIONS

"IP Routing Policies and Filters", printed from http://support.baynetworks.com/library/tpubs/html/switches/bstream/115401A/L__17.1-HTM on Sep. 26, 2002.

K. Swaminathan, "Negotiated Access Control", Proceedings of the 1985 Symposium on Security and Privacy: Apr. 22-24, 1985, pp. 190-196.

W. LeFebvre, "Permissions and Access Control Lists", Performance Computing, vol. 16, No. 11, Oct. 1998, pp. 59-61.
B. Dunkel et al., "Customized Metadata for Internet Information", 1997 First International Conference on Knowledge-Based Intelligent Electronic Systems: Proceedings, vol. 2, May 21-23, 1997, pp. 508-516.
U. Srinvasan et al., "Managing Heterogeneous Information Systems through Discovery and Retrieval of Generic Concepts", Journal of the American Society for Information Science, vol. 51, No. 8, Jun. 2000, pp. 707-723.
J. Martinez et al., "MPEG-7 The Generic Multimedia Content Description Standard, Part 1", vol. 9, No. 2, Apr.-Jun. 2002, pp. 78-87.
C. Süβ et al., "Meta-modeling for Web-Based Teachware Management", Advances in Conceptual Modeling: ER'99 Workshops on Evolution and Change in Data Management, Reverse Engineering in Information Systems, and the World Wide Web and Conceptual Modeling, 1999, pp. 360-373.
K. Lang et al., "XML, metadata and efficient knowledge discovery", Knowledge-Based Systems, vol. 13, No. 5, Oct. 2000, pp. 321-331.
T. Baker, "A Multilingual Registry for Dublin Core Elements and Qualifiers", ZfBB 47, 2000, pp. 14-19.
J. Moy, OSPF Version 2, Networking Working Group, RFC 2328, Ascend Communications, Inc., Apr. 1998, pp. 1-204.
J. Moy, OSPF Version 2, Networking Working Group, RFC 1247, Proteon, Inc., Jul. 1991, pp. 1-177.
G. Bull, et al., "Access Control Lists", printed from http://curry.edschool.virginia.edu/go/spinning/ACL__Permissions.html on Sep. 18, 2002, 5 pages.
Security in JDK 1.1, Access Control Abstractions, May 2, 1997, printed from http://java.sun.com/products/jdk/1.1/docs/guide/security/Acl.html, on Sep. 18, 2002, 4 pages.
T. Saito, et al., "Privacy Enhanced Access Control by SPKI", IEEE, 2000, pp. 301-306.
G. Fernandez et al., "Extending the UNIX Protection Model with Access Control Lists", Proceedings of the Summer 1988 USENIX Conference, Jun. 20-24, 1988, pp. 119-132.
A. Chander et al., "A State-Transition Model of Trust Management and Access Control", Proceedings 14$^{th}$ IEEE Computer Security Foundations Workshop, Jun. 11-13, 2001, pp. 27-43.
D. Wichers et al., "PACL's: An Access Control List Approach to Anti-Viral Security", Information Systems Security: Standards—The Key to the Future: 13$^{th}$ National Computer Security Conference, Oct. 1-4, 1990, vol. 1, pp. 340-349.
M. Benantar et al., "Use of DSOM Before/After Metaclass for Enabling Object Access Control", IRP/IEEE International Conference on Distributed Platforms: Client/Server and Beyond, 1996, pp. 73-85.
M. Koch et al., "Conflict Detection and Resolution in Access Control Policy Specifications", FOSSACS 2002, pp. 223-237.
M. Calbucci, "Windows 2000 Security Descriptors", Dr. Dobb's Journal, vol. 25, No. 11, Nov. 2000, pp. 57-58, 60, 63, 66.
J. Hwang, et al., "Access control with role attribute certificates", Computer Standards & Interfaces, vol. 22 No. 1, Mar. 2000, pp. 43-53.
J. Qian, et al., "ACLA: A Framework for Access Control List (ACL) Analysis and Optimization", IFIP TC6/TC11 Joint Working Conference on Communications and Multimedia Security 5$^{th}$, 2001, pp. 197-211.
Office Action dated Dec. 10, 2009 cited in U.S. Appl. No. 11/254,545.
Office Action dated Dec. 10, 2009 cited in U.S. Appl. No. 11/254,539.
Notice of Allowance dated Jan. 26, 2010 cited in U.S. Appl. No. 11/254,264.
Notice of Allowance dated Jan. 27, 2010 cited in U.S. Appl. No. 11/254,539.
Notice of Allowance dated Jan. 29, 2010 cited in U.S. Appl. No. 11/254,545.
Notice of Allowance dated Feb. 4, 2010 cited in U.S. Appl. No. 11/207,034.
Office Action dated Jan. 7, 2010 cited in U.S. Appl. No. 10/270,441.
Notice of Allowance dated Mar. 12, 2010 cited in U.S. Appl. No. 11/207,034.
Office Action dated Mar. 16, 2010 cited in U.S. Appl. No. 11/838,161.
U.S. Appl. No. 11/838,161, Mail Date Nov. 24, 2010, Notice of Allowance.
SOAP Security Extensions: Digital Signature, W3C NOTE Feb. 6, 2001, http://www.w3.org/TR/2001/NOTE-SOAP-dsig-20010206/.
IP Encapsulating Security Payload (ESP), Ipsec Working Group, Internet Draft, Draft-ietf-ipsec-esp-v3-03.txt, Expires Jan. 2003, S. Kent, BBN Technologies, Jul. 2002.
Mark Bartel et al., "XML—Signature Syntax and Processing", Aug. 20, 2001, 60 pages, http://www.we.org/TR/2001/PR-xmldsig-core-20010820/.
An Introduction to XML Digital Signatures, Simon et al., http://www.xml.com/pub/a/2001/08/08/xmldsig.html.
"TIBCO Rendezvous—a TIBCO Active Enterprise Product", http://www.tibco.com/products/rv/index.html, printed Dec. 10, 2001, 20 Pages.
"TIBCO Rendezvous TX—a TIBCO Active Enterprise Product", http://www.tibco.com/products/rv/rvtx.html, Printed Dec. 10, 2001 2 Pages.
"TIBCO Enterprise for JMS", http://www.tibco.com/products/enterprise_for_jms.html, printed Dec. 10, 2001, 1 Page.
Henrick F. Nielsen et al., "SOAP Routing Protocol", http://www.gotdot.com/team/xml_wsspecs/soap-rp/default.html, May 23, 2001, 36 Pages.
G. Robert Malan et al., "An Extensible Probe Architecture for Network Protocol Performance Measurement", Department of Electrical Engineering and Computer Science, University of Michigan, SIGCOMM 1998, Vancouver, pp. 215-227.
Kunihiko Toumura et al., "Implementing Multiple Name Spaces Using An Active Network Technology", Jun. 2003, pp. 1665-1676.
David Potter et al., "Connecting minis to local nets with discrete modules", Data Communications, Jun. 1983, pp. 161-164.
Steven M Dean et al., "CONE: A Software Environment for Network Protocols", Hewlett-Packard Journal, Feb. 1990, pp. 18-28.
Fumiko Kouda et al., "Representation of Descriptive Name and the Resolution Method with a Semantic Network Structure", Journal of Information Processing, vol. 15, No. 2, 1992, pp. 280-292.
Henrick F. Nielsen et al., "Direct Internet Message Encapsulation", May 23, 2001, 13 Pages.
B.Ramsey, "An RTOS with its Nest is Pure Dynamite", Electronic Engineering Times Sep. 11, 1995, No. 865, p. 76, 3 Pages.
Richard Bowers, "Apple's Free Internet Domain Name Server Software", Post-Newsweek Business Information, Inc., May 2, 1996, 1 Page.
Kees Leune, Mike Papazoglou, Willem-Jan Van Den Heuvel, "Specification and Querying of Security Constraints in the EFSOC Framework", Nov. 2004, ICSOC '04: Proceedings of the 2nd International Conference on Service Oriented Computing, pp. 125-133.
Rotzal, Peter H., "X 400 Message Handling System: The Remote User Agent," Proceedings of the Military Communications Conference (MILCOM), Jun. 11, 1995, vol. 1, pp. 433-437.
European Search Report dated Jun. 28, 2006 (02023016.5), 6 pages.
Mourad, A. et al., "Scalable Web Server Architectures"; Proceeding IEEE International Symposium on Computer and Communications; Jul. 1, 1999; pp. 12-16; WP000199852.
Nikkei Network, No. 17, Sep. 2001, pp. 94-97.
"Windows NT TCP/IP Networking 9. DNS (Domain Name System)", Let's Start with TCP/IP, Dec. 31, 2000, pp. 156-159.
"Preliminary Knowledge for Managing a Website, Basic Knowledge of Domain Name," Basics of Creating a Website Which Can Be Understood With the Help of Illustration, Aug. 31, 2000, pp. 179-185.
Nikkei Network, No. 4, Aug. 2000, pp. 104-112.
Nikkei Byte, No. 211, Dec. 2000, pp. 176-181.
Nikkei Communications, No. 355, Feb. 5, 2001, pp. 106-113.
Nikkei Communications, No. 340, Apr. 16, 2001, pp. 216-217.
Conference paper, Proceedings—Twenty Third Annual International Computer Software and Applications Conference, Publication Date 1999, USA, date Oct. 27-29, 1999.

Cantor, "The ICAAP Project 3 PSF Distributed Computing Environment", Journal—Library Hi Tech, vol. 15, No. 1-2, p. 79-83, Publication Date 1997, USA.
Simms, "Windows on the Internet", Journal—Wall Street & Technology, Suppl. Issue p. 16, 18-19, Publication Dated Fall 1997, USA—Abstract.
Doward, Pike, Presotto, Ritchie, Trickey, Winterbottom; "The Inferno /sup TM/ Operating Systems", Journal—Bell Labs Technical Journal, vol. 2, No. 1, p. 15-18 Publication Date, Winter, 1997, USA.
Benner, Russell, "Practical High-Impedance Fault Detection on Distribution Feeders", Journal—IEEE Transactions on Industry Applications, vo. 33, No. 3, p. 635-640, publication date May-Jun. 1997, USA.
Conference—Jones, "Computer Use Policies, the Challenge of Updating Lab Software Security", User Services Conference XXI Part vol. 1, pp. 222-224, vol. 1, Publication Date 1993, USA.
Conference—Schwartau, "Proceedings of International Conference Virus Bulletin", Date Sep. 9-10, 1993, Location Amsterdam, Publication Date 1993, UK.
Udell, "LAN Manager 2.0: A Force to Be Reckoned With: Microsoft's network flagship proves it is a viable alternative to NetWare" , Journal—BYTE, vol. 15, No. 13, pp. 221-222, 224, 226, Publication Date Dec. 1990, USA.
Conference—Olson, Levine, Jones, Bodoff, Bertrand, "Concurrent Access Licensing", Proceedings of the Summer 1988 USENIX Conference, pp. 287-294, Publication date 1988, USA, Conference date Jun. 21-24, 1988—San Francisco.
"XML Schema Part 0: Primer", W3C Proposed Recommendation, Mar. 30, 2001, 64 Pages (Dec. 11, 2004).
CCIE Fundamentals: Network Design and Case Studies, Second Edition, by Cisco Systems, Inc. Publisher: Cisco Press, Publication Date: Oct. 19, 1999, Print ISBN—10: 1-57870-167-8.
European Search Report—Application No. 02023017—Oct. 6, 2005.
Wallstrom, Bengt, "Queuing System with *Time*-*Outs* and Random Departures", Ericsson Technics, v 33 n 2 1977, pp. 151-174.
11. Using Dublin Core, issued Jul. 16, 2000 by Diane Hillmann, pp. 1-10.
Structured Graph Format: XML Metadata for describing website structure, Liechi et al. pp. 11-21, Issue 1998.
Office Action dated Nov. 17, 2003 cited in U.S. Appl. No. 10/219,898.
Office Action dated Apr. 21, 2004 cited in U.S. Appl. No. 10/219,898.
Office Action dated Oct. 6, 2004 cited in U.S. Appl. No. 10/219,898.
Office Action dated Oct. 26, 2006 cited in U.S. Appl. No. 10/219,898.
Office Action dated Mar. 26, 2007 cited in U.S. Appl. No. 10/219,898.
Notice of Allowance dated Aug. 15, 2007 cited in U.S. Appl. No. 10/219,898.
Office Action dated Mar. 22, 2007 cited in U.S. Appl. No. 10/693,290.
Office Action dated Sep. 20, 2007 cited in U.S. Appl. No. 10/693,290.
Office Action dated Mar. 28, 2008 cited in U.S. Appl. No. 10/693,290.
Notice of Allowance dated Oct. 15, 2008 cited in U.S. Appl. No. 10/693,290.
Office Action dated Jan. 7, 2005 cited in U.S. Appl. No. 09/983,555.
Office Action dated Jul. 7, 2005 cited in U.S. Appl. No. 09/983,555.
Office Action dated Mar. 23, 2006 cited in U.S. Appl. No. 09/983,555.
Office Action dated Sep. 11, 2006 cited in U.S. Appl. No. 09/983,555.
Office Action dated Sep. 21, 2004 cited in U.S. Appl. No. 09/993,656.
Office Action dated Dec. 23, 2004 cited in U.S. Appl. No. 09/993,656.
Office Action dated Nov. 29, 2005 cited in U.S. Appl. No. 09/993,656.
Notice of Allowance dated May 25, 2007 cited in U.S. Appl. No. 09/993,656.
Office Action dated Dec. 30, 2004 cited in U.S. Appl. No. 09/983,539.
Office Action dated Jun. 17, 2005 cited in U.S. Appl. No. 09/983,539.
Office Action dated Jan. 18, 2006 cited in U.S. Appl. No. 09/983,539.
Notice of Allowance dated May 8, 2006 cited in U.S. Appl. No. 09/983,539.
Office Action dated Jan. 26, 2009 cited in U.S. Appl. No. 11/422,106.
Notice of Allowance dated Aug. 10, 2009 cited in U.S. Appl. No. 11/422,106.
Notice of Allowance dated Oct. 27, 2009 cited in U.S. Appl. No. 11/422,106.
Office Action dated Oct. 4, 2005 cited in U.S. Appl. No. 10/068,444.
Office Action dated Mar. 31, 2006 cited in U.S. Appl. No. 10/068,444.
Office Action dated Oct. 13, 2006 cited in U.S. Appl. No. 10/068,444.
Office Action dated Mar. 23, 2006 cited in U.S. Appl. No. 11/254,264.
Office Action dated Aug. 11, 2006 cited in U.S. Appl. No. 11/254,264.
Office Action dated Mar. 7, 2007 cited in U.S. Appl. No. 11/254,264.
Office Action dated Aug. 7, 2007 cited in U.S. Appl. No. 11/254,264.
Office Action dated May 29, 2008 cited in U.S. Appl. No. 11/254,264.
Office Action dated Nov. 17, 2008 cited in U.S. Appl. No. 11/254,264.
Office Action dated Jul. 9, 2009 cited in U.S. Appl. No. 11/254,264.
Office Action dated May 28, 2008 cited in U.S. Appl. No. 11/254,545.
Office Action dated Nov. 26, 2008 cited in U.S. Appl. No. 11/254,545.
Office Action dated Jul. 8, 2009 cited in U.S. Appl. No. 11/254,545.
Office Action dated May 28, 2008 cited in U.S. Appl. No. 11/254,539.
Office Action dated Nov. 28, 2008 cited in U.S. Appl. No. 11/254,539.
Office Action dated Jul. 9, 2009 cited in U.S. Appl. No. 11/254,539.
Office Action dated Mar. 7, 2006 cited in U.S. Appl. No. 11/254,519.
Office Action dated Aug. 11, 2006 cited in U.S. Appl. No. 11/254,519.
Office Action dated Nov. 5, 2004 cited in U.S. Appl. No. 10/007,060.
Office Action dated May 11, 2005 cited in U.S. Appl. No. 10/007,060.
Notice of Allowance dated Jun. 27, 2005 cited in U.S. Appl. No. 10/007,060.
Office Action dated Jul. 20, 2005 cited in U.S. Appl. No. 10/999,837.
Office Action dated Dec. 21, 2005 cited in U.S. Appl. No. 10/999,837.
Office Action dated May 25, 2006 cited in U.S. Appl. No. 10/999,837.
Notice of Allowance dated Sep. 18, 2006 cited in U.S. Appl. No. 10/999,837.
Office Action dated Feb. 23, 2006 cited in U.S. Appl. No. 10/270,442.
Office Action dated Aug. 3, 2006 cited in U.S. Appl. No. 10/270,442.
Office Action dated Jan. 24, 2007 cited in U.S. Appl. No. 10/270,442.
Office Action dated Aug. 8, 2007 cited in U.S. Appl. No. 10/270,442.
Office Action dated Jan. 25, 2008 cited in U.S. Appl. No. 10/270,442.
Office Action dated Sep. 15, 2008 cited in U.S. Appl. No. 10/270,442.
Office Action dated Feb. 26, 2009 cited in U.S. Appl. No. 10/270,442.
Notice of Allowance dated Sep. 1, 2009 cited in U.S. Appl. No. 10/270,442.
Office Action dated Mar. 21, 2007 cited in U.S. Appl. No. 11/207,034.
Office Action dated Oct. 4, 2007 cited in U.S. Appl. No. 11/207,034.
Office Action dated May 28, 2008 cited in U.S. Appl. No. 11/207,034.
Office Action dated Dec. 5, 2008 cited in U.S. Appl. No. 11/207,034.
Office Action dated May 11, 2009 cited in U.S. Appl. No. 11/207,034.
Notice of Allowance dated Dec. 3, 2009 cited in U.S. Appl. No. 10/270,442.

* cited by examiner

```
<METADATA>
	<SCOPE>  HTTP://WWW.XYZCO.COM/MBOXSVC/ </SCOPE>
	<PROPERTIES>
		<EXPIRE>"10/15/2002"</EXPIRE>
		<AUTHOR>"RAD"</AUTHOR>
	</PROPERTIES>
	<STATEMENTS>
		<MAX_MSG_LEN>1024</MAX_MSG_LEN>
		<INCLUDE IDREF="COMMON_STATEMENTS"/>
	</STATEMENTS>
	<SECURITY>
		<SIGNATURE>"SKLH...SDN3"</SIGNATURE>
		<MD5HASH>"D41D...427E"</MD5HASH>
	</SECURITY>
</METADATA>
```

```
<ACL>
    <RESOURCE-SCOPE> HTTP://STOCKTICKER.COM/ </RESOURCE-SCOPE>
    <RULES>
        <RULE>
            <ID-SCOPE> USERID="Jon" AND PW="BrokeR$" </ID-SCOPE>
            <GRANT> EXCH="NYSE" </GRANT>
1001        <DENY> EXCH="NASDAQ" </DENY>
        </RULE>
        <RULE>
            <ID-SCOPE>
                MSG_FORMAT=...; AND
                AUTHORITY="VERISIGN"
1003        </ID-SCOPE>
            <GRANT> TICKER="MSFT" </GRANT>
        </RULE>
    </RULES>
    <PROPERTIES>
        NAME="DEFAULT"
        VERSION=1.0
        AUTHOR="MR. MANAGER"
    </PROPERTIES>
    <SECURITY> ... </SECURITY>
</ACL>
```

*FIG. 10*

```
<ACL>
    <RESOURCE-SCOPE> C:\CORP\DEPT1\DIV3\ </RESOURCE-SCOPE>
    <RULES>
        <RULE>
            <ID-SCOPE>
                AUTH=Y
                LEVEL=EXECUTIVE
1101        </ID-SCOPE>
            <GRANT> +R+E </GRANT>
        </RULE>
    </RULES>
    <PROPERTIES>
        NAME="CORP_DEFAULT"
        VERSION=2.0
        AUTHOR="ADMIN"
    </PROPERTIES>
    <SECURITY> ... </SECURITY>
</ACL>
```

*FIG. 11*

SCOPED ACCESS CONTROL METADATA ELEMENT

This application claims priority to provisional U.S. Application Ser. Nos. 60/329,796 filed Oct. 16, 2001, 60/346,370 filed Oct. 19, 2001, and 60/371,155 filed on Apr. 10, 2002.

FIELD OF THE INVENTION

The invention relates generally to computer networks and access to objects stored on computer networks. More specifically, the invention relates to methods and systems for providing an extensible access control metadata element relating to one or more objects via an object scope.

BACKGROUND OF THE INVENTION

Currently, much of the utility of computer systems lies in their ability to communicate and share information with other computer systems. Information is typically passed between computer systems via computer networks. Computer networks are groups of computers interconnected by wires or wireless mechanisms such as infrared, radio, and other technologies. The Internet is a global network of many smaller computer networks connected to one another. There is no controlling central network, but rather several high level networks that are connected through network access points. A network access point is a computer hardware or software device (commonly a network router) that serves as a kind of translator between two different networks.

Web services, generally, refers to application-to-application communication over the Internet via programmatic interfaces. For example, a local application (e.g., Microsoft® Money) on a client computer may communicate with a server application on a remote computer to obtain stock ticker information. The two applications may communicate the requested ticker symbol and the corresponding results via one or more messages transmitted over the Internet, without opening or using a traditional Internet browser such as Internet Explorer®.

An access control list (ACL), generally, is a data structure that defines who has access to a single specified object stored on a computer or network. More specifically, an ACL typically indicates the access rights each user or group has. Access rights for file objects typically include the right to read a file, write the file, delete the file, and execute the file. Examples of objects to which ACLs may refer include files, directories, subdirectories, web services, computer resources, and the like. In known ACL-based systems, each object includes a security attribute that identifies its corresponding ACL. Typically the metadata for each object points to its corresponding ACL. FIG. 1 illustrates a logical relationship between objects (files) stored on a computer and corresponding ACLs according to known ACL solutions, where each file points to a corresponding ACL defining its access rights. In other known systems (not shown), two or more objects may point to the same ACL, however, the ACL cannot indicate the objects to which it corresponds. That is, one cannot learn for which objects an ACL defines access rights by querying the ACL; instead, one must query the object to determine the corresponding ACL.

Known ACLs provide limited group and role-based access rights. Group access rights refer to granting access rights to each user who is a member of a specified group, e.g., a department within a company. Role-based access rights refer to granting access rights to each user identified as having a specified role, e.g., "tester" or "programmer". However, known ACL solutions do not allow dynamic access rights based on other attributes, nor do known ACL solutions allow an ACL or other access control element to determine the objects for which it defines access rights.

Thus, it would be an advancement in the art to be able to have an access control element that indicates the objects for which it defines access rights. It would be a further advancement if the access control element allowed access rights to be based on constraints other than a user's identity, group, or role.

BRIEF SUMMARY OF THE INVENTION

The inventive method and system overcomes the problems of the prior art by providing a generic metadata container that defines a scope of objects to which included access rights statements apply. The generic metadata container can be used to define access control metadata that indicates access rights to the objects encompassed by the scope, as well as to define a range of users subject to the access rights, thus allowing access control list data to point to the objects and users to which is applies, instead of being pointed to by one or more objects.

A system can determine the access rights for an object by comparing the object to a range of objects defined in an access control metadata element, and by comparing the user requesting access to the object with a range of users subject to the metadata element's included access rights, the user range also being defined in the metadata element. If the object is within the range of objects defined by the metadata element, and the requesting user is within the range of users defined by the metadata element, then the access rights defined in the metadata element are applied to the requesting user.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 10 illustrates an access control metadata element for a web service according to an illustrative embodiment of the invention.

FIG. 11 illustrates an access control metadata element for a storage subdirectory according to an illustrative embodiment of the invention.

DETAILED DESCRIPTION OF THE INVENTION

Figure 2:
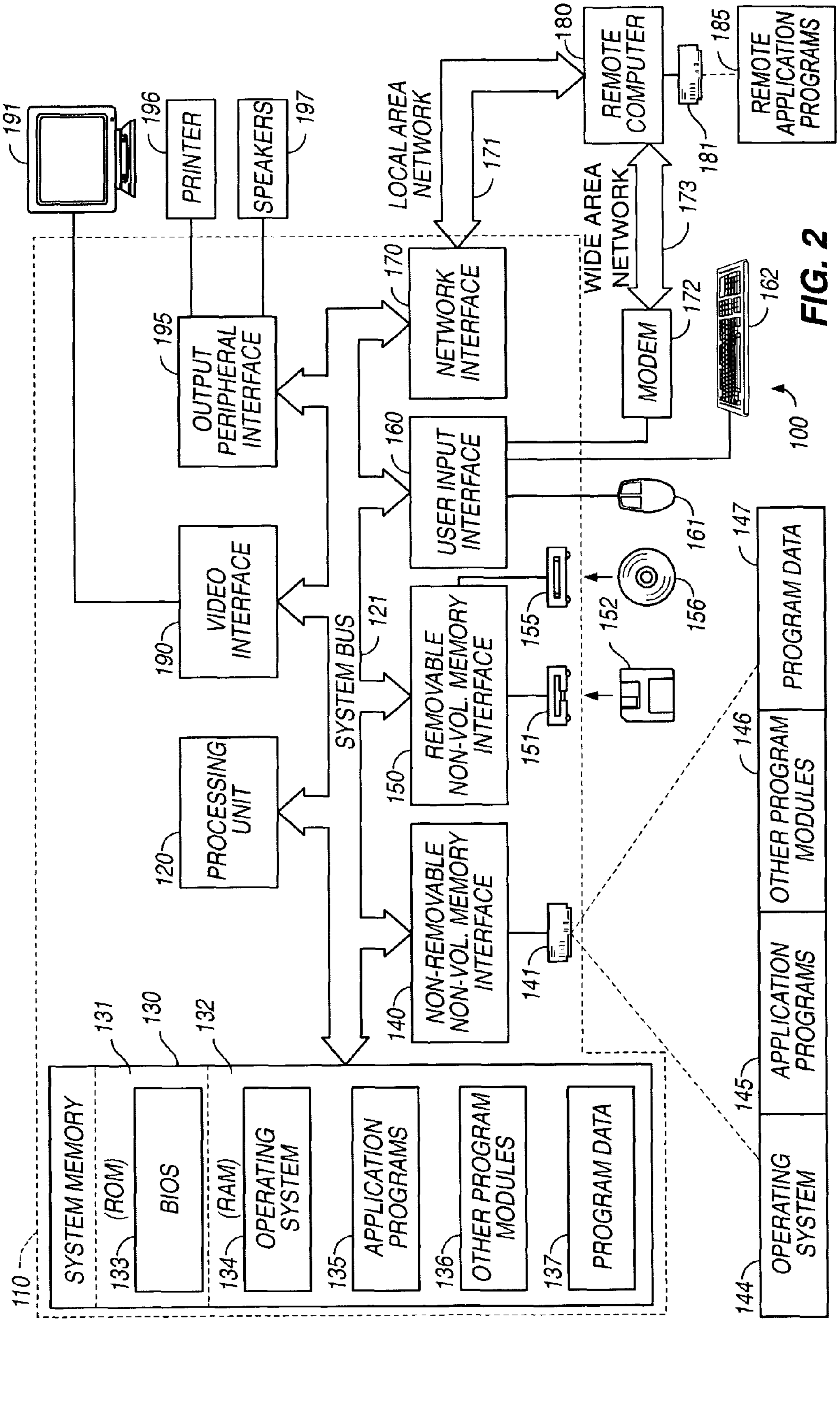
FIG. 2 illustrates a general operating environment that may be used according to one or more illustrative aspects of the invention.

According to one or more aspects of the invention, dynamic access control metadata is described using any protocol neutral communications mechanism, e.g., eXtensible Markup Language (XML), as further described below. FIG. 2 illustrates an example of a suitable computing system environment 100 on which the invention may be implemented in whole or in part. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 1:
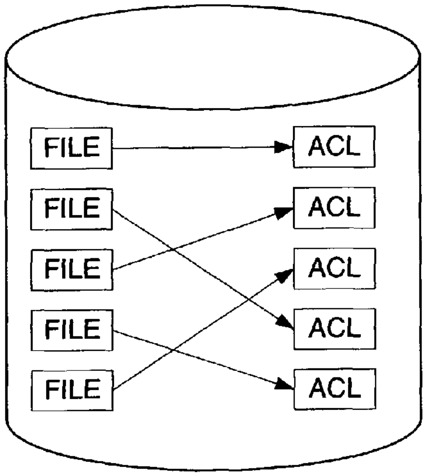
FIG. 1 illustrates a logical relationship between files and access control lists (ACL) using conventional ACLs.
Figure 3:
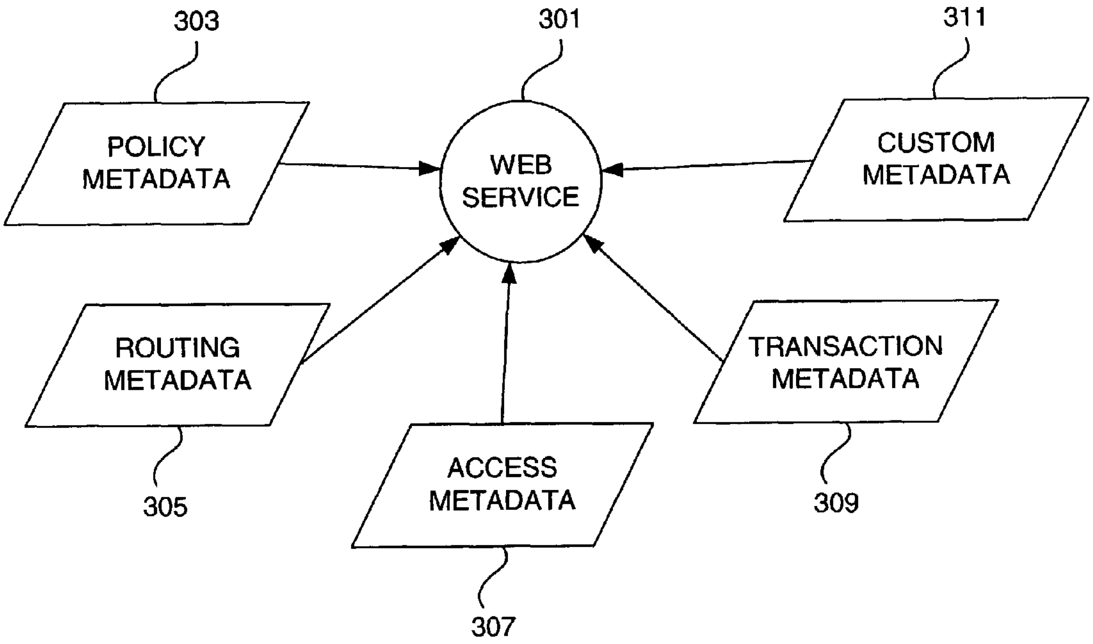
FIG. 3 illustrates a block diagram relating metadata to an object.

FIG. 3 illustrates a block relational diagram of an object and corresponding metadata. Broadly, an object 301 is described by various metadata elements 303, 305, 307, 309, 311. Each metadata element describes some aspect of object 301. Object 301 may be any computer or network object, such as a file, URL, URI, address, directory, web service, router, server, etc. Metadata elements 303, 305, 307, 309, 311 are used to describe features corresponding to object 301. Object 301 may alternatively be a conventional, non-computer object, such as a computer user (i.e., a person).

For example, a web service 301 may be described by various metadata elements 303, 305, 307, 309, 311. Each metadata element may be communicated by the web service object 301 (or by a web service description service) to a requestor (not shown) to indicate how the requestor can communicate with the web service to receive information provided by the web service. Alternatively, object metadata might not be used by a requestor, but instead may be used by the web service itself upon receipt from an authorized provider (e.g., providing updated policy metadata, access control metadata, etc.).

Suppose web service object 301 is a mailbox web service. Metadata element 303 may describe communication policies of web service 301, such as by indicating that web service 301 requires a Microsoft Passport ID, messages must be encrypted using triple-DES encryption, messages cannot exceed 1 MB in size, etc. Metadata element 305 may describe message routing information specific to the web service, e.g., indicating that messages intended for web service object 301 should be sent to a specified address or through a specified router or routers.

Metadata element 307 may describe access control information, serving a similar function as an access control list, but with more flexibility. That is, metadata may be used to describe who is authorized to access web service 301, such as only those users whose account is paid up to date, users sending a message having specified content, etc. Specified content can include security or authorization related content, e.g., a password, or can refer to non-security and/or authorization related content, e.g., a purchase order. Access control metadata may also include an access control list (ACL) defining access rights for the mailbox web service. Metadata element 309 may describe transaction coordination information for communicating with web service 301, such as by indicating a transaction coordinator for web service 301, and/or other transaction information as described in copending application Ser. No. 10/211,299, filed Aug. 5, 2002, entitled "Coordinating Transactional Web Services."

Metadata element 311 may describe custom features specific to web service object 301, such as mailbox services provided (supported addresses, mail formats, mail protocols, confirmation of delivery, etc.), requirements for various services, and the like.

Figures 4, 5:
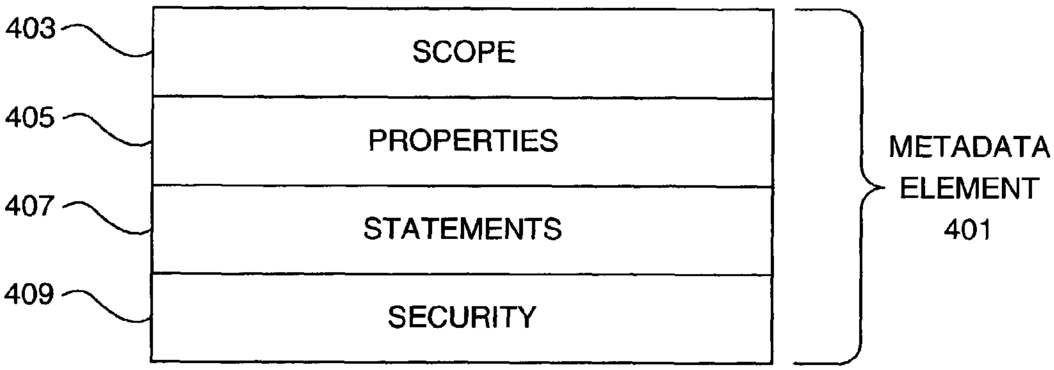
FIG. 4 illustrates a block diagram of metadata according to an illustrative embodiment of the invention.
FIG. 5 illustrates metadata described according to an illustrative embodiment of the invention.

FIG. 4 illustrates a block diagram of a generic metadata element according to an illustrative aspect of the invention. Metedata element 401 may include a scope 403, one or more properties 405, one or more statements 407, and security information 409.

Scope 403 indicates an arbitrary universe of targets (i.e., the object or objects) to which metadata element 401 corresponds. For example, scope 403 may include a URI for Microsoft.com, indicating that metadata element 401 describes any web page or web service located under that URL. Scope 403 may include a portion of a directory hierarchy (e.g., c:\root\users\jdoe\), indicating that metadata element 401 describes all files located at or below the specified subdirectory. Scope 403 can also refer to users or user identities, e.g., *@xyz.com, jdoe@xyz.com, "John Doe", etc. Scope 403 may also refer to a user based on biometric information, e.g., by including a digital representation of biometric information specific to the user, such as a fingerprint, thus indicating that the metadata element 401 describes the user with the fingerprint to which the digital biometric information corresponds.

Scope 403 may describe multiple objects using lists, ranges, or any known object description technique, and may describe the universe of targets in an additive (John Doe, but no one else) or subtractive (everyone but John Doe) manner, using declarative (scope="John Doe"), programmatic (scope=run this Java applet), extensional (scope=John, Bill, Mary) and/or intentional (e.g., scope=The Jones Family, scope=John's mother's dog) descriptors. Scope 403 may describe the scope using arbitrarily complex relationships. Using the generic scope container, metadata element 401 can refer to virtually any object. For example, scope can refer to messages of a specified form, and further based on whether the current location is an intermediary node in a network or a terminal node of a data message. Scope 403 can also depend on whether messages are being sent from a location or to a location, and messages that contain specific information (e.g., the word "banana" in the message body). Scope can refer to messages that have been authenticated, and even to messages that have been authenticated using a specified technology (e.g., X509) or service (e.g., VeriSign), security token of a specific format as well as authority, strength of authentication, biometric data, smart card, or the like. Scope can also refer to the message in which the scope is being communicated (e.g., by message ID). One of skill in the art will appreciate that scope 403 can refer to any universe of targets that can be positively identified based on the data stored in scope 403.

Properties 405 describe properties of metadata element 401. That is, properties 405 may be thought of as metadata describing metadata element 401, such as name, author, expiration date/time, etc., of metadata element 401.

Each statement 407 provides some substantive metadata included in metadata element 401. Statements may be affirmatively recited (e.g., Max_Msg_Len=1024) or included by reference (e.g., Include IDREF="xx"), where the IDREF indicates a file or other object storing one or more metadata statements. Inclusion by reference may be used, for example, when multiple metadata elements need to ensure that identical statements are used. One of skill in the art will appreciate that any external reference may be used to include metadata statements, such as a URI, etc., and also that inclusion by reference may also be used for scope, properties, and security elements.

Security 409 describes security semantics and/or authentication measures to be applied to metadata element 401. For example, security 409 may include a digital signature to ensure that the metadata comes from a source authorized to promulgate the included or referenced metadata statements. One of skill in the art will appreciate that multiple scope, properties, statement, and/or security elements may be included in metadata element 401 as necessary, e.g., to include a scope with two mutually exclusive ranges making up the universe of targets. In addition, scopes, properties, statements, and security information may all be described using arbitrarily complex relationships using any combination of logical operands.

The generic metadata element 401 may be described in any protocol-neutral or platform-independent description language, such as XML, Java (or other Java-derived language), and the like. A metadata element described using XML may take a form similar to that illustrated in FIG. 5. One of skill in the art will appreciate that alternative syntax may be used without departing from the spirit and scope of the invention. For example, when the scope refers to a single object, a metadata element may omit the scope reference and instead include an attribute such as <Metadata about=" . . . "> . . . </Metadata>. Metadata statements as described herein may be sent as part of data messages, e.g., simple object access protocol (SOAP) messages, or may be included in web service description documents, such as WSDL documents.

Figure 6:
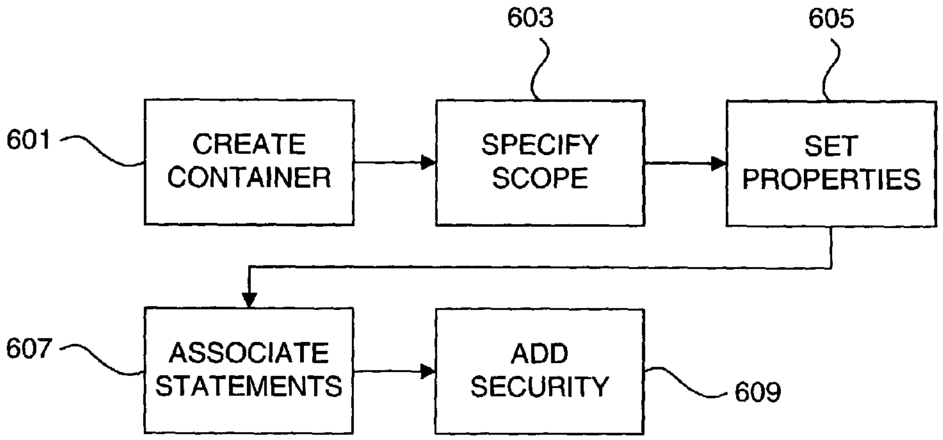
FIG. 6 illustrates a flowchart for creating a metadata container according to an illustrative embodiment of the invention.

FIG. 6 illustrates a flow chart for a method of creating a scoped metadata container according to an illustrative embodiment of the invention. In step 601 an empty container is created. In step 603, the scope is defined and stored in a scope section of the container or, alternatively, as an attribute. In step 605, properties are optionally set and stored in a properties section of the container. In step 607, metadata statements are associated with the container and stored in a statements section of the container. In step 609, security and authentication information is optionally stored in a security section of the container.

Figure 7:
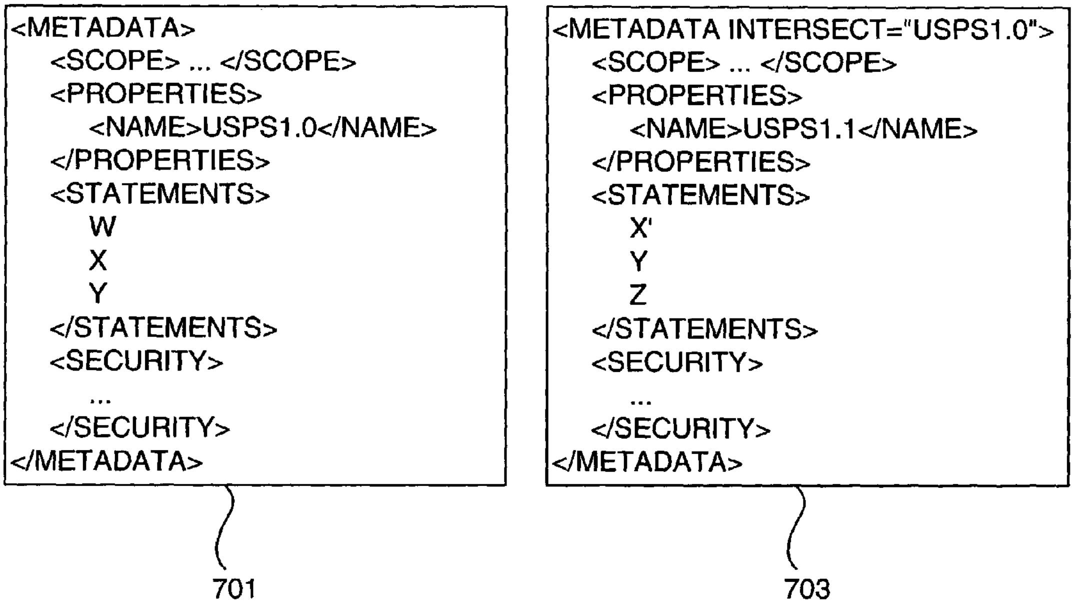
FIG. 7 illustrates a metadata refinement technique according to an illustrative embodiment of the invention.

According to another illustrative aspect of the invention, with reference to FIG. 7, one metadata element 703 may refine, replace, restrict, or intersect with another metadata element 701. For example, within a business organization, each division of the company may use standard division-wide metadata that is required to be included in all metadata elements (e.g., similar to using an "Include IDREF"-type statement) produced by that division. Likewise each department might require standard department-wide metadata included in metadata elements produced by that department, and the company as a whole may require standard company-wide metadata statements included in each metadata element produced by the company. If metadata statements conflict between two levels of the metadata hierarchy (e.g., company versus division), the invention provides a resolution mechanism to determine which statements, if any, remain in effect. For example, a division may include a metadata statement indicating that maximum message length is 1 MB. However, company-wide guidelines may require inclusion of another metadata statement that includes an indication that maximum message length can only be 512 KB. This may be resolved in various ways according to various aspects of the invention.

When two metadata elements refer to the same scope, one metadata element can merge with, replace, or intersect with another metadata element. When the statements of two metadata elements do not conflict, the two metadata elements may be merged together. When the statements do conflict, one metadata element may replace the other, or they may be selectively intersected (i.e., conventional intersection of sets, or alternatively intersected as described below). During intersection, non-conflicting metadata statements may be merged, while conflicting metadata statements may be selected according to the most recent or superceding metadata element. That is, non-conflicting statements are merged as a "union" set, while for any conflicting metadata statements, one conflicting metadata statement will supercede the other conflicting metadata statement according to predetermined rules.

For example, as illustrated in FIG. 7, suppose metadata element 701 contains statements W, X, and Y, and suppose refining metadata element 703, which intersects with element 701, contains statements X', Y, and Z. An intersection of metadata elements 701 and 703 would contain statements W, X', Y, and Z, assuming X' supercedes X. Other merge/intersection techniques may also be used as desired. In addition, a metadata element may also indicate that it cannot be replaced, for example, by including <Metadata Final="T"> . . . </Metadata> to indicate that that specific metadata element cannot be replaced or intersected with another metadata element. Those of skill in the art will appreciate that various metadata tags, or attributes, may be used to indicate the nature of the relationship between two metadata elements, e.g., invalidates, replaces, intersects, refines, merges, or the like.

According to another aspect of the invention, logical inferences or an inherent or natural hierarchy may be used to determine whether one metadata element supersedes another. For example, a metadata element with scope=.foo.com/bar may automatically supersede another metadata element with scope=.foo.com.

Using metadata refinement and replacement, a web service can define default metadata for general services, and refine the default metadata for based on various service levels. For example, a default metadata element may indicate that Passport authentication must be used, but remain silent as to each user's maximum mailbox size. This default metadata can then be refined to indicate that the maximum mailbox size for users in the default "silver" service level is 1.5 MB. Another metadata element may refine the default metadata element and indicate, for messages authenticated as being from a "gold" service level member, the maximum mailbox size is 10 MB.

As indicated above, policy metadata may be used to convey information to a user directed towards aiding communication with an object, e.g., a web service. Similarly, access control metadata may be used to convey information to a web service regarding who can access an object (i.e., the web service) and what access rights each user has with respect to the object. A user may include a human user, an application accessing a computer resource, a web service, or any other program that accesses an object. That is, an ACL generally describes a relationship between one or more identities of objects and one or more access rights. According to an illustrative aspect of the invention, a metadata type may optionally be included, e.g., <Metadata Type="authorization"> . . . </Metadata> to indicate a class or type of metadata, e.g., access control metadata. One of skill in the art will appreciate that alternative syntax, as is known in the art, may be used to indicate a metadata type. For example, metadata statements may include a "type" indicator instead of placing the "type" indicator in the metadata element's header.

Figure 8:
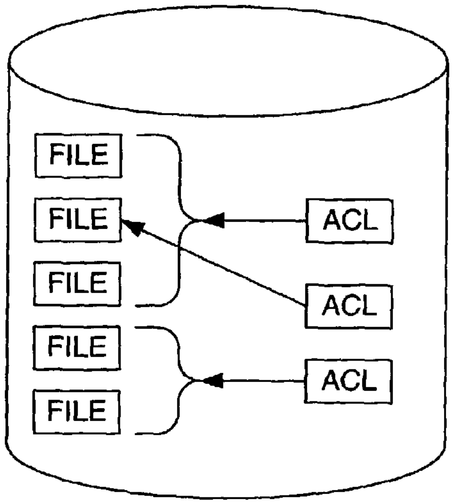
FIG. 8 illustrates a logical relationship between files and access control lists (ACL) according to an illustrative embodiment of the invention.

Unlike traditional access control lists, scoped access control metadata can be used to provide access rights with respect to a range of objects. FIG. 8 illustrates logical relationships between scoped access control metadata and the objects to which they refer. FIG. 8 illustrates that, instead of objects pointing to access control lists defining the access rights for that object, according to an aspect of the present invention the access control metadata points to the object or objects for which it provides access rights. These object(s) are defined by a scope 403 (FIG. 4) provided in the access control metadata.

Figure 9:
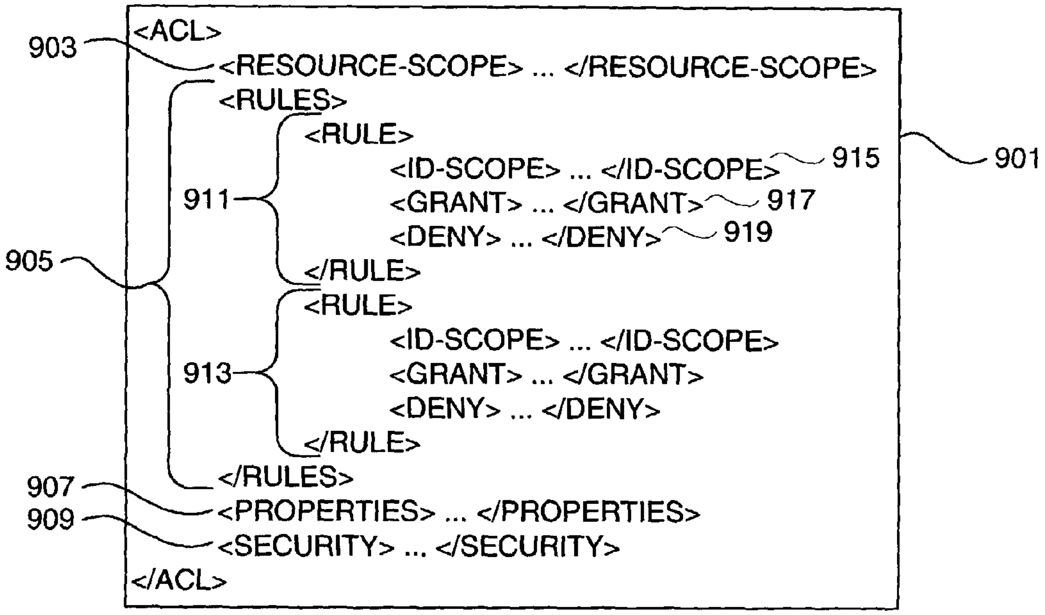
FIG. 9 illustrates an access control metadata element according to an illustrative embodiment of the invention.

FIG. 9 illustrates a scoped metadata element customized for use as an access control metadata element according to an illustrative embodiment of the invention. Customization may include renaming field names to make the metadata element easier to understand to a reader, and alteration of syntax to apply the scoped metadata element to access control rights. However, one of skill in the art will appreciate that field names may be any desired name, and countless syntactic variations may be used to achieve the same functionality described herein.

In FIG. 9, a scoped access control metadata element 901 includes a resource scope 903, rules 905, properties 907 (optional), and security 909 (optional). The rules 905 may include one or more rule statements 911, 913. Resource scope 903 identifies the range of objects for which element 901 provides the access rights. The resource scope 903 may refer to a file (or portion of a file), a web service, a network service, a resource, or any other computer or network object for which access rights need to be defined, as desired by a user, administrator, organization, etc., as appropriate. Resource scope 903 may also refer to "real world" objects such as a physical building (e.g., the access control metadata may be sent to a building guard who, upon reading the metadata or an interpretation of the metadata, is instructed that only individuals wearing yellow clothes may enter the building). Rules 905 include one or more access control-related statements, e.g., rule statements 911 and 913. Each access control metadata element may optionally also include properties 907 and security data 909, as described above.

Each rule statement 911, 913 may include a statement ID scope 915, and either or both of a list of granted access rights 917, and a list of explicitly denied access rights 919. The statement ID scope 915 identifies a range of one or more users to whom the granted rights 917 and/or denied rights 919 of the rule statement 911 apply. Each access control metadata element 901 may include multiple rule statements, thus providing different access rights for different users. Each statement scope may explicitly identify the range of users, e.g., "Isabella AND Houlton", or may identify criteria which, if met, the corresponding access rights apply, e.g., "message_text INCLUDES 'banana'" or "Access_Location=LAN" (i.e., the user is accessing the object from within a trusted network, not from the public Internet or via a tunnel). Any scope identifying criteria may be used such that each user can affirmatively be determined to be either within or outside of the provided statement scope. For example, the statement scope may indicate all users belonging to a particular group. Alternatively, the scope may encompass all users who provide a correct key or password, or any message received of a specified format, signed by a particular signing authority (e.g., VeriSign). Each rule statement 911, 913 also includes either or both of granted access rights 915 and denied access rights 917. Each set of rights defines rights that are granted or denied, e.g., "read AND execute" for the users included within the corresponding statement scope.

Thus, for example with reference to FIG. 10, an access control metadata element may be provided that indicates default access rights for a stock ticker lookup web service that can be accessed at stockticker.com. A first rule 1001 may indicate that the user with UserID="Jon" can access stocker ticker information for stocks listed on the New York Stock Exchange (NYSE), but not stock ticker information for stocks listed on NASDAQ. A second rule 1003 may indicate that when a message of a specified format is received and the message is signed with a VeriSign certificate, then the user sending the message can receive stock ticker information for the stock with ticker information "MSFT".

In another example, with reference to FIG. 11, and access control metadata element may be provided that indicates file access rights for all files stored in a specified subdirectory on a storage device (and any files stored under that subdirectory). FIG. 11 illustrates an access control metadata element where anyone of the level "Executive", and who has been authenticated, can read and execute files in the subdirectory C:\Corp\Dept1\Div3\. The requirement that the user be authenticated can be independent of the token format used, e.g., Kerberos, X.509, Passport, etc. Alternatively, specific authentication token formats may be required. Other rules statements may be included (not shown) that indicate that anyone of the level "administrator" can read, write, and execute files in the scoped subdirectory. That is, multiple rule statements can be used to grant various access rights to different users or ranges of users (e.g., managers can submit purchase orders <=$1000, while general managers can submit purchase orders >$1000 and <=$10000). Those of skill in the art will appreciate that these are just two examples of infinite object scopes and rule statement scopes that can be defined.

According to an aspect of the invention, rights may be based on a user having a particular role that is mapped to a bundle of rights. This role based access control (RBAC) can be used to provide dynamic access rights based on a user's role with respect to an object. For example, a user whose role is "editor", as defined by some entity, may have predetermined access rights to an object corresponding to that entity. Thus, roles can be used to provide access rights to dynamic portions of data. For example, a user X may be specified as editor of a file Y. There may exist a rule statement that indicates all editors have read, write, and execute access rights with respect to that which they are an editor.

According to an aspect of the invention, grant and deny rights may be an additive and subtractive set of rights (e.g., the right exists if sum total of the right >0). Alternatively, grant and deny rights may be an order-based set of rights (e.g., the most recent grant/deny of a right supercedes prior grants/denies of the same right).

According to another aspect of the invention, access rights can be included by reference, as described above, or copied from some other resource or access control metadata element. That is, in an XML embodiment, a rule statement may include a tag such as <CopyOf> indicating another access control metadata element from which the present access control metadata element copies rule statements. Alternatively, or in addition, a rule statement may include a tag such as <CopyOnWrite> indicating that whenever the referenced element is updated, the updated element should be again copied and used as the basis for the present metadata element. Using <CopyOf> and <CopyOnWrite> or similarly functional tags (e.g., an INCLUDE reference), multiple access control metadata elements can maintain identical or similar access rights without requiring that each element be updated. Instead, a primary element can be updated, and other elements are updated by reference to the primary element. One of skill in the art will appreciate that <CopyOf> and <CopyOnWrite> may be regarded as processing directives (as opposed to actual metadata statements) by the access control system, describing where to get or how to get the ACL that should be used.

Another aspect of the invention provides for dynamic exclusion of a user or users from a scope in which the user or users would otherwise be included. A tag such as <EXCLUDE> . . . </EXCLUDE> may be provided in a statement scope, indicating one or more users to exclude from the statement scope when the users would otherwise be included in the statement scope.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computing system for controlling access to a plurality of objects, the computing system comprising:

a processor; and memory that stores a scoped access control metadata element that controls access to a plurality of objects that are stored in a computer storage medium of the computing system, wherein the scoped access control metadata element comprises:

a resource scope statement that identifies a plurality of objects for which the scoped access control metadata element provides access rights by defining a portion of a directory hierarchy indicating that the scoped access control metadata element provides access rights for a plurality of file objects located at or below the specified portion of the directory hierarchy; and a rules statement that includes a plurality of rule statements that each define different access control rules for accessing the plurality of objects, including:

a first rule statement that includes:

a first statement scope that identifies a first set of one or more users to whom the first rule statement applies and who may access the plurality of objects, including a rule that defines the first set of one or more users as users that have been authenticated; and a first grant statement that defines what access rights the first set of one or more users are granted for accessing any one of the plurality of objects; and a second rule statement that includes:

a second statement scope that identifies a second set of one or more users to whom the second rule statement applies and who may also access the plurality of objects; and a second grant statement that defines what different access rights the second set of one or more users are granted for accessing any one of the plurality of objects, the computing system further comprising memory that stores computer-executable instructions that, when executed, implement a method, comprising:

receiving a request from a user to access one of the plurality of file objects, the user included in one or more of the first set of one or more users or the second set of one or more users;

determining that the scoped access control metadata element provides access rights to the one of the plurality of file objects; and granting the user access to the one of the plurality of file objects, as defined by the scoped access control metadata element.

2. The computing system of claim 1, wherein the scoped access control metadata element further comprises:

one or more properties statements that describe properties of the scoped access control metadata element, the properties comprising an expiration time of the scoped access control metadata element.

3. The computing system of claim 1, wherein the scoped access control metadata element further comprises:

one or more security statements that define authentication measures to be applied when a user attempts to modify the scoped access control metadata element.

4. The computing system of claim 1, wherein the resource scope statement also defines a Uniform Resource Identifier (URI) indicating that the scoped access control metadata element provides access rights for a plurality of web pages or web services located under the URI, including a web service.

5. The computing system of claim 1, wherein the rules statement contains references the plurality of rule statements, such that the rules are not directly contained within the rules statement.

6. The computing system of claim 1, wherein the scoped access control metadata element further comprises:

an indication that the scoped access control metadata element cannot be replaced by, or merged or intersected with another scoped access control metadata element.

7. The computing system of claim 1, wherein the second rule statement also includes:

a deny statement that defines what access rights the second set of one or more users are denied for accessing any one of the plurality of objects.

8. The computing system of claim 7, wherein the second statement scope identifies the second set of one or more users as all users belonging to a user group.

9. The computing system of claim 7, wherein the second statement scope identifies the second set of one or more users as an explicit list of users.

10. The computing system of claim 7, wherein the second statement scope identifies the second set of one or more users as all users who provide a correct key or password.

11. The computing system of claim 7, wherein the second statement scope identifies the second set of one or more users as all users who provide a properly signed message.

12. The computing system of claim 1, wherein the first rule statement also includes a deny statement that defines what access rights the first set of one or more users are denied for accessing any one of the plurality of objects.

13. A computer storage medium storing a particular data structure comprising:

a scope element that contains criteria for determining a plurality of objects the particular data structure applies to for controlling what users may access the plurality of objects, wherein the criteria of the scope element defines a portion of a directory hierarchy indicating that the particular data structure provides access rights for a plurality of file objects located under the portion of the directory hierarchy; and one or more rule elements that define access rights for accessing the plurality of file objects, including:

a first rule element that contains (1) first user rules that define a first set of one or more users to whom the first rule element applies and who may access the plurality of file objects, including a first rule that defines the first set of one or more users as users that have been authenticated, and (2) first access rules that define what access rights the first set of one or more users are granted for accessing any one of the plurality of file objects; and a second rule element that contains (1) second user rules that define a second set of one or more users to whom the second rule element applies and who may also access the plurality of file objects, and (2) second access rules that define what different access rights the second set of one or more users are granted for accessing any one of the plurality of file objects, the computer storage medium further storing computer-executable instructions that, when executed by at least one processor of a computer system, implement a method, comprising:

an act of the computer system receiving a request from a user to access the one of the plurality of file objects, the user included in at least the first set of one or more users;

an act of the computer system determining that the particular data structure controls what users may access the plurality of file objects, as defined by the criteria of the scope element of the particular data structure;

an act of the computer system determining that the user is included in the first set of one or more users and that the user has been authenticated, as defined by the first user rules of the first rule element of the particular data structure; and an act of the computer system granting the user access to the one of the plurality of file objects, as defined by the first access rules of the first rule element of the particular data structure.

14. The computer storage medium of claim 13, wherein the particular data structure further comprises:

one or more properties elements that describe properties of the particular data structure, the properties comprising one or more of a name, author, or expiration time of the particular data structure.

15. The computer storage medium of claim 13, wherein the particular data structure further comprises:

one or more security elements that define authentication measures to be applied when a user attempts to modify the particular data structure.

16. The computer storage medium of claim 13, wherein the one or more rule elements contain references to rules for defining the range of users such that the rules are not directly contained within the data structure.

17. The computer storage medium of claim 13, wherein the particular data structure further comprises:

an indication that the particular data structure cannot be replaced by, or merged or intersected with another data structure.

18. A method for determining whether a user has access to a requested object, comprising:

receiving, at a computing system which includes at least one processor, a request from a user to access a particular file object;

accessing an access control metadata element stored on the computing system to determine whether the user is authorized to access the particular file object, comprising:

determining that the access control metadata element provides access rights to the particular file object based on a resource scope statement that identifies a plurality of file objects, including the particular file object, for which the access control metadata element provides access rights by defining a portion of a directory hierarchy indicating that the scoped access control metadata element provides access rights for the plurality of file objects, which are located at or below the specified portion of the directory hierarchy, including the particular file object;

determining that the access control metadata element provides access rights for the user based on one or more rule statements, the one or more rule statements including:

a first rule statement that includes (i) a first statement scope that identifies a first set of one or more users, including the user, to whom the first rule statement applies, the first statement scope including a first rule that defines the first set of one or more users as users that have been authenticated, and (ii) a first grant statement that defines what access rights the first set of one or more users are granted for accessing any one of the plurality of file objects; and a second rule statement that includes (i) a second statement scope that identifies a second set of one or more users to whom the second rule statement applies, and (ii) a second grant statement that defines what different access rights the second set of one or more users are granted for accessing any one of the plurality of file objects;

determining that at least the first rule statement grants the user access to the particular file object based on the first statement scope and the first grant statement; and upon determining that the first rule statement grants the user access to the particular file object, and upon determining that the particular file object is within the plurality of file objects identified by the resource scope statement, granting the user access to the particular file object in accordance with the first grant statement defined in the first rule statement of the access control metadata element.

19. The method of claim 18, further comprising:

receiving, at a computing system, a request from the user to modify the access control metadata element; and determining whether the user is authenticated to modify the access control metadata element based on one or more security statements that define authentication measures to be applied when a user attempts to modify the access control metadata element.

20. The method of claim 18, wherein the resource scope statement also defines a Uniform Resource Identifier (URI) indicating that the access control metadata element provides access rights for a plurality of web pages or web services located under the URI, including a web service.

21. The method of claim 18, wherein the rules statement contains references the one or more rule statements, such that the rules are not directly contained within the rules statement.

22. The method of claim 18, wherein the access control metadata element further comprises:

an indication that the access control metadata element cannot be replaced by, or merged or intersected with another access control metadata element.

* * * * *